United States Patent
Suzuki et al.

(10) Patent No.: US 9,904,017 B2
(45) Date of Patent: Feb. 27, 2018

(54) OPTICAL COUPLER AND OPTICAL COUPLING METHOD OF OPTICAL FIBER WITH GRIN LENS

(71) Applicant: TOYO SEIKAN GROUP HOLDINGS, LTD., Tokyo (JP)

(72) Inventors: Taro Suzuki, Tokyo (JP); Naofumi Maruyama, Kanagawa (JP); Gou Endo, Tokyo (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 15/522,527

(22) PCT Filed: Nov. 25, 2015

(86) PCT No.: PCT/JP2015/083008
§ 371 (c)(1),
(2) Date: Apr. 27, 2017

(87) PCT Pub. No.: WO2016/104020
PCT Pub. Date: Jun. 30, 2016

(65) Prior Publication Data
US 2017/0329088 A1   Nov. 16, 2017

(30) Foreign Application Priority Data
Dec. 22, 2014  (JP) ................... 2014-259425

(51) Int. Cl.
*G02B 6/32*  (2006.01)
*G02B 6/38*  (2006.01)

(52) U.S. Cl.
CPC ............. *G02B 6/32* (2013.01); *G02B 6/3885* (2013.01)

(58) Field of Classification Search
CPC ........... G02B 6/32; G02B 6/3885; G02B 6/38
See application file for complete search history.

(56) References Cited

U.S. PATENT DOCUMENTS

| 5,039,193 A | * | 8/1991 | Snow ..................... G02B 6/262 |
| | | | 385/25 |
| 6,768,593 B1 | * | 7/2004 | Jutamulia ............ G02B 6/4206 |
| | | | 359/641 |

(Continued)

FOREIGN PATENT DOCUMENTS

| JP | 4-110808 | 4/1992 |
| JP | 2002-243991 | 8/2002 |

(Continued)

OTHER PUBLICATIONS

Woonggyu Jung et al., "Numerial analysis of gradient index lens-based optical coherence tomography imaging probes"; J. Biomedical Optics, vol. 15 (6); Dec. 30, 2010, pp. 066027-1 to 066027-10.

(Continued)

*Primary Examiner* — Andrew Jordan
(74) *Attorney, Agent, or Firm* — Greenblum & Bernstein, P.L.C.

(57) ABSTRACT

In an optical coupler in which optical fibers with GRIN lenses, each having an optical fiber and a GRIN lens joined coaxially, are disposed to face each other coaxially, with a preset inter-lens distance WD being provided, and to couple transmission light of one of the optical fibers with GRIN lenses to the other one of the optical fibers with GRIN lens, an intermediate position of the inter-lens distance WD is set to match a beam waist position of light with a shortest wavelength $\lambda_m$ out of the transmission light, and a lens length z along an optical axis direction of the GRIN lens is set in accordance with a bottom of a coupling loss due to a distance-shift D of a beam waist position of light with a wavelength $\lambda_i$ different from the $\lambda_m$ out of the transmission light.

4 Claims, 9 Drawing Sheets (a)

(b)

(56) References Cited

U.S. PATENT DOCUMENTS

| | | | |
|---|---|---|---|
| 8,218,928 B2 * | 7/2012 | Jasapara | H04B 10/2581 359/341.1 |
| 8,909,017 B2 * | 12/2014 | Jasapara | H04B 10/2581 359/341.1 |
| 9,250,390 B2 * | 2/2016 | Muendel | G02B 6/32 |
| 9,823,422 B2 * | 11/2017 | Muendel | G02B 6/32 |
| 2002/0054428 A1 * | 5/2002 | Seward | G02B 6/4206 359/362 |
| 2002/0140942 A1 | 10/2002 | Fee et al. | |
| 2002/0141714 A1 | 10/2002 | Reed et al. | |
| 2002/0150333 A1 | 10/2002 | Reed et al. | |
| 2003/0076598 A1 | 4/2003 | Kittaka et al. | |
| 2003/0118305 A1 | 6/2003 | Reed et al. | |
| 2004/0028329 A1 | 2/2004 | Reed et al. | |
| 2005/0105096 A1 | 5/2005 | Fee et al. | |
| 2010/0271689 A1 * | 10/2010 | Jasapara | G02B 6/0288 359/341.1 |
| 2012/0237164 A1 * | 9/2012 | Jasapara | G02B 6/0288 385/33 |
| 2013/0148925 A1 * | 6/2013 | Muendel | G02B 6/32 385/27 |
| 2016/0116679 A1 * | 4/2016 | Muendel | G02B 6/32 385/11 |

FOREIGN PATENT DOCUMENTS

| | | |
|---|---|---|
| JP | 2002-350666 | 12/2002 |
| JP | 2008-20560 | 1/2008 |

OTHER PUBLICATIONS

D. Marcuse, "Loss Analysis of Single-Mode Fiber Splices"; The Bell System Techincal Journal, vol. 56, No. 5; May-Jun. 1977, pp. 703-718.

International Search Report issued in WIPO Patent Application No. PCT/JP2015/083008, dated Feb. 9, 2016.

English translation of Written Opinion of the International Search Authority.

* cited by examiner (a)

OPTICAL COUPLER AND OPTICAL COUPLING METHOD OF OPTICAL FIBER WITH GRIN LENS

TECHNICAL FIELD

The present invention relates to an optical coupler in which optical fibers with GRIN lenses are disposed to face each other and an optical coupling method of the same.

BACKGROUND ART

In an optical information transmission system using an optical fiber, an optical coupler in which light emitted from one optical fiber end is caused to enter another optical fiber end via a space is an optical module of high functionality in which a function element such as a wavelength selector, an optical splitter, an optical switch, an optical isolator, or an optical modulator can be inserted to the space. Conventionally, in such an optical coupler, light passing through a space has been made close to parallel light by a collimator using a pair of convex lenses. However, a collimator with a convex lens is large in diameter relative to the outer diameter of an optical fiber, and there has been a problem that demands to reduce the diameter and increase the density of an optical transmission system cannot be met.

Figure 1:
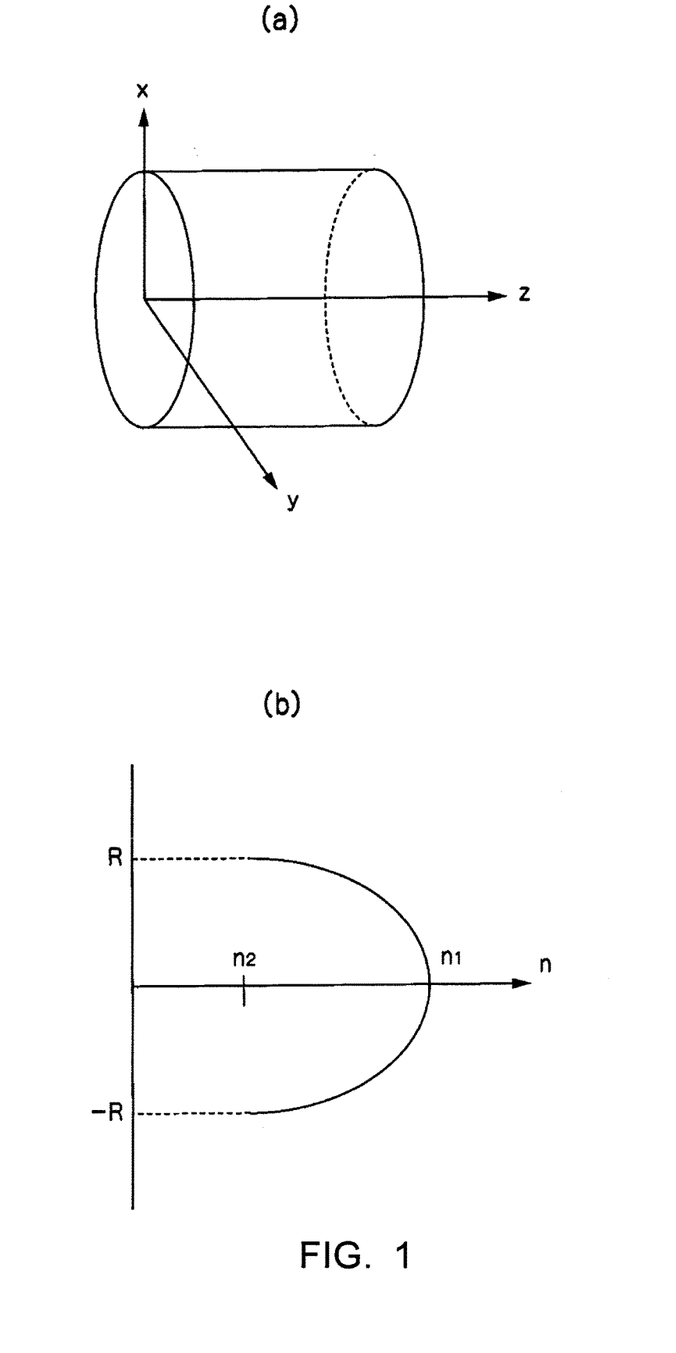
FIG. 1 is a set of illustration diagrams showing the refractive index distribution of a GRIN lens.

In contrast, as an optical coupler that can meet the demands to reduce the diameter and increase the density, an optical fiber collimators pair is known (see PLT 1 below) in which an optical fiber and a GRIN lens (gradient index lens) are joined coaxially and in which the tip end surfaces of a pair of the GRIN lenses are arranged to face each other with a predetermined inter-lens distance being provided. The GRIN lens used therein is, as shown in FIG. 1(a), cylindrical with approximately the same diameter as the optical fiber and has, as shown in FIG. 1(b), a refractive index distribution with a highest refractive index $n_1$ at the central axis and with a refractive index n decreasing continually in a quadratic curve away from the central axis in the direction of the outer circumference. For a representation of the refractive index n in sectional directions x and y with a function n(r) of a distance r from the central axis, the representation can be with an equation (1) below.

[Math. 1]

$$n(r) = n_1\left\{1 - \frac{1}{2}(gr)^2\right\} \quad (1)$$

Herein, g is a constant (distribution constant) representing the GRIN lens' capability to concentrate light, $n_1$ is the central refractive index of the GRIN lens, r is the distance in the radial direction (where $r^2=x^2+y^2$), and $n_2$ is the refractive index for a lens radius R. The relationship of the central refractive index $n_1$, the distribution constant g, and the lens radius R is represented by an equation (2) below.

[Math. 2]

$$gR \cong \frac{1}{n_1}\sqrt{n_1^2 - n_2^2} = \frac{NA}{n_1} \quad (2)$$

Herein, NA is the numerical aperture (hereinafter abbreviated as "NA"), as it is called, and is a parameter representing the lens performance. A lens with a higher NA is a lens with a higher capability to concentrate light.

CITATION LIST

Patent Literature

[Patent literature 1] Japanese Patent Application Laid-open No. 2008-20560

Non Patent Literature

[Non Patent Literature 1] Jung W, Benalcazar W A, Ahmad A, Sharma U, Tu H and Boppart S A, "Numerical analysis of gradient index lens-based optical coherence tomography imaging probes", J. Biomed. Opt. 15(6), 066027 (Dec. 30, 2010).

[Non Patent Literature 2] Marcuse D, "Loss analysis of single-mode fiber splices", Bell System Technical Journal, 56:5. May-June 1977 pp 703-718.

SUMMARY OF INVENTION

Technical Problem

Figure 2:
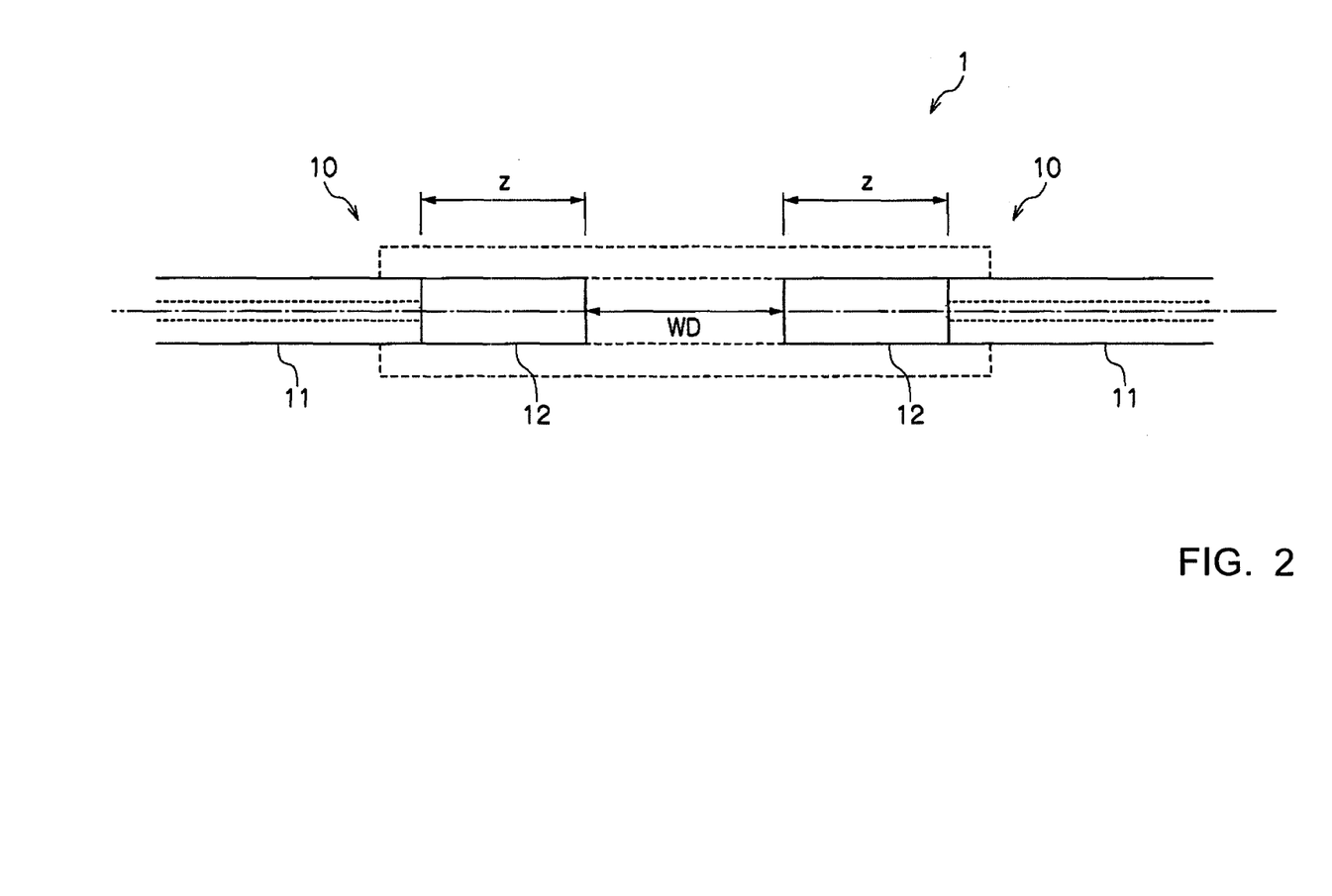
FIG. 2 is an illustration diagram showing an optical coupler in which optical fibers with GRIN lens are disposed to face each other.

FIG. 2 shows an optical coupler 1 in which optical fibers with GRIN lenses 10 are disposed to face each other. In the optical coupler 1, optical fibers 11 and GRIN lenses 12 that are joined coaxially are arranged to face each other with an inter-lens distance WD being set. As a configuration example of the optical coupler 1, the silica GRIN lens 12 and the optical fiber 11 that is a single-mode optical fiber are joined. In the case where the numerical aperture of the optical fiber 11 is $NA_f$ and the numerical aperture of the GRIN lens 12 is $NA_g$, $0.090 \leq NA_g \leq 0.17$, and $NA_f \leq NA_g$. Further, in the case where the outer diameter of the optical fiber 11 is $D_f$ and the outer diameter of the GRIN lens 12 is R, $D_f - 3\ \mu m \leq R \leq D_f$.

In the case where the inter-lens distance WD is short, a length z of the GRIN lens in the optical axis direction in the optical coupler 1 in which the optical fibers with GRIN lenses 10 are disposed to face each other is set to a length of $z_{1/4}$ shown by an equation (3) below or a length of an odd multiple thereof. However, in the case where the inter-lens distance WD is set to be long, the lens length z is set to be longer than $z_{1/4}$, in order to improve the coupling efficiency.

$$z_{1/4} = \pi/(2g) \quad (3)$$

Figure 3:
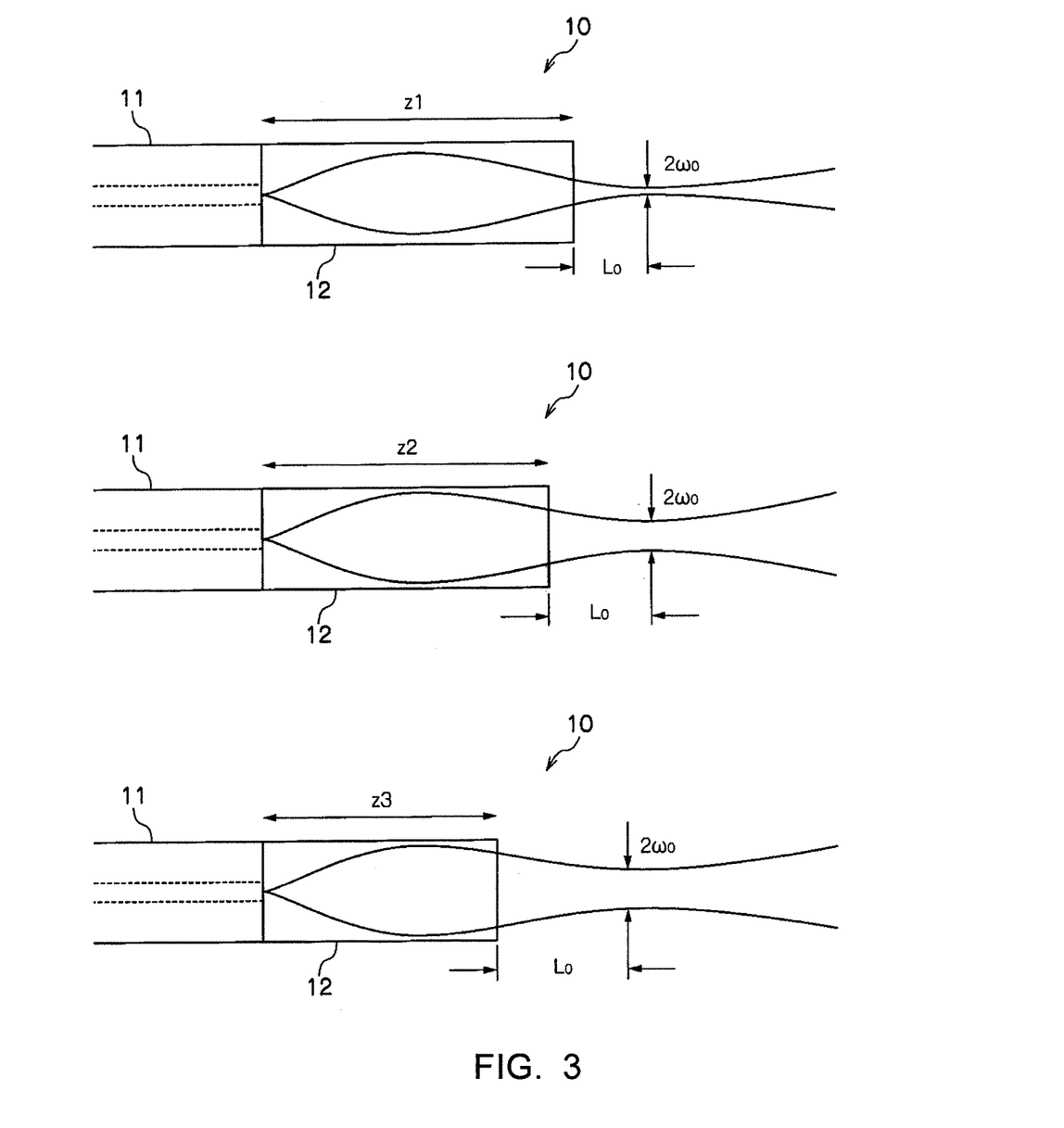
FIG. 3 is an illustration diagram showing the difference in light-concentrating characteristics for emitted light, in the case where the GRIN lens length is changed in the optical fiber with GRIN lens.

As shown in FIG. 3, when the lens length z is made longer than $z_{1/4}$ shown by the equation (3) described above, light emitted from the optical fiber 11 is approximately a Gaussian beam. Concentrating this with the GRIN lens 12 does not cause focusing to one point but causes focusing to a diameter of a certain size ($2\omega_0$). A portion in the focused state is called a beam waist, and the diameter $2\omega_0$ is called a beam waist diameter.

In the case where the length z of the GRIN lens 12 is changed between $z_{1/4}$ shown by the equation (3) described above and $z_{1/2}$, which equals $2 \times z_{1/4}$, the beam waist diameter $2\omega_0$ and a distance (beam waist distance) $L_0$ from the end surface of the GRIN lens 12 on the light-emitting side to the beam waist position change, as shown in FIG. 3. That is, when the length z of the GRIN lens 12 is changed in a range where $z_{1/2} > z > z_{1/4}$ to gradually decrease from z1 to z2 to z3, the beam waist diameter $2\omega_0$ gradually increases, and the beam waist distance $L_0$ also gradually increases. However, the beam waist diameter $2\omega_0$ and the beam waist distance $L_0$ respectively have peaks at different lens lengths z.

In the optical coupler 1 in which the optical fibers with GRIN lenses 10 having such light-concentrating characteristics face each other to be symmetrical on the left and right and coaxially, setting the GRIN lens length z such that $z_{1/4} < z < z_{1/2}$ allows an effective inter-lens distance WD to be set between the end surfaces of the GRIN lenses 12. Setting the inter-lens distance WD to two times the beam waist distance $L_0$ (such that WD=$2 \times L_0$) allows optimization of the coupling efficiency.

However, with an optical coupler including a GRIN lens having a specific refractive index distribution, in the case where light with different wavelengths is transmitted with the optical fiber 11, the refractive index distribution of the lens changes for each wavelength of transmission light, due to dispersion through the very material providing the refractive index. As a result, since the beam waist distance $L_0$ becomes different values, setting the inter-lens distance WD (which equals $2 \times L_0$) on the basis of the beam waist distance $L_0$ with respect to a specific wavelength causes a problem that an optimum coupling efficiency cannot be obtained with light with other wavelengths of light that is transmitted.

One example of a task of the present invention is to address such a problem. That is, an object of the present invention is, for instance, to allow, in an optical coupler in which optical fibers with GRIN lenses are disposed to face each other coaxially with a predetermined inter-lens distance being provided, an appropriate coupling efficiency to be obtained with each wavelength without changing the setting of the inter-lens distance for each wavelength, even in the case where light with different wavelengths is transmitted.

Solution to Problem

For the present invention, in order to achieve such an object, there is an optical coupler in which optical fibers with GRIN lenses, each having an optical fiber and a GRIN lens joined coaxially, are disposed to face each other coaxially, with a preset inter-lens distance being provided, and to couple transmission light of one of the optical fibers with GRIN lenses to the other one of the optical fibers with GRIN lenses, wherein an intermediate position of the inter-lens distance is set to match a beam waist position for light with a shortest wavelength out of the transmission light, and wherein a lens length along an optical axis direction of the GRIN lens is set in accordance with a bottom of a coupling loss due to a distance-shift of a beam waist position of light with a wavelength different from the wavelength out of the transmission light.

An optical coupling method of an optical fiber with a GRIN lens of the present invention is a method of an optical fiber with a GRIN lens in which optical fibers with GRIN lenses, each having an optical fiber and a GRIN lens joined coaxially, are disposed to face each other coaxially, with a preset inter-lens distance being provided, to couple transmission light of one of the optical fibers with GRIN lenses to the other one of the optical fibers with GRIN lenses, the method including: setting an intermediate position of the inter-lens distance to match a beam waist position for light with a shortest wavelength out of the transmission light; and setting a lens length along an optical axis direction of the GRIN lens in accordance with a bottom of a coupling loss due to a distance-shift of a beam waist position of light with a wavelength different from the wavelength out of the transmission light.

Advantageous Effects of Invention

With the present invention having such a feature, an appropriate coupling efficiency can be obtained with each wavelength without changing the setting of the inter-lens distance for each wavelength, even in the case where light with different wavelengths is transmitted, in the optical coupler and optical coupling method in which the optical fibers with GRIN lens are disposed to face each other coaxially with a predetermined inter-lens distance being provided.

DESCRIPTION OF EMBODIMENTS

An optical coupler and an optical coupling method according to an embodiment of the present invention will be described, taking an example of the optical coupler 1 (see FIG. 2) in which the optical fibers with GRIN lens 10 in which a single-mode optical fiber is joined with a silica GRIN lens (gradient index lens) are disposed to face each other coaxially with the predetermined inter-lens distance WD being provided. The lens length z of the GRIN lens 12 herein is set between $z_{1/4}$ shown by the equation (3) above and $z_{1/2}$, which equals $2 \times z_{1/4}$. In this case, as described earlier, light emitted from one optical fiber with GRIN lens 10 is approximately a Gaussian beam, and the behavior of the emitted light can be described with mainly the beam waist diameter $2\omega_0$ and the beam waist distance $L_0$ (see FIG. 3).

Herein, in the optical coupler 1 including the GRIN lens 12 for which the equations (1) and (2) described earlier hold, the beam waist distance $L_0$ and the beam waist radius $\omega_0$ can be represented by equations (4) and (5) below (see NPL 1). That is, the beam waist distance $L_0$ and the beam waist radius $\omega_0$ of the optical coupler 1 can be represented as a function of a wavelength $\lambda$ of transmission light and the lens length z. In the equations (4) and (5), the mode field diameter (slightly larger than the core diameter of a single-mode optical fiber) of light with the wavelength $\lambda$ transmitted in the optical fiber 11, a single-mode optical fiber, is $2\omega_s$.

[Math. 3]

$$L_0 = \frac{\left(gn_1 - \frac{1}{gn_1}\left(\frac{\lambda}{2\pi\omega_s^2}\right)^2\right)\cos(gz)\sin(gz)}{(gn_1)^2\sin^2(gz) + \left(\frac{\lambda}{2\pi\omega_s^2}\right)^2\cos^2(gz)} \quad (4)$$

$$\omega_0\omega_s = \sqrt{\frac{\cos(gz) - gn_1 L_0 \sin^2(gz) + \left\{L_0\cos(gz) + \frac{1}{gn_1}\sin(gz)\right\}^2}{\{\cos(gz) - gn_1 L_0 \sin(gz)\}\cos(gz) + gn_1\left\{L_0\cos(gz) + \frac{1}{gn_1}\sin(gz)\right\}\sin(gz)}} \quad (5)$$

In evaluating the coupling efficiency of the optical coupler 1, consider a state where the beam waist diameters formed upon emitting light with the wavelength $\lambda$ from the respective two optical fibers with GRIN lens are $2\omega_1$ and $2\omega_2$ and where there is the distance-shift D in the beam waist position. For evaluation, assuming $k = 2\pi/\lambda$, a coupling efficiency $\eta$ at that time can be represented by equations (6) and (7) below (see NPL 2).

[Math. 4]

$$\eta = \frac{4\left[4Z^2 + \left(\frac{\omega_1}{\omega_2}\right)^2\right]}{\left[4Z^2 + 1 + \left(\frac{\omega_1}{\omega_2}\right)^2\right]^2 + 4Z^2\left(\frac{\omega_2}{\omega_1}\right)^2} \quad (6)$$

$$Z = \frac{D}{n_2 k \omega_1 \omega_2} \quad (7)$$

The optical coupler 1 according to the embodiment of the present invention uses the optical fiber with GRIN lens 10 that is symmetrical on the left and right. Therefore, $\omega_1 = \omega_2 = \omega_0(\lambda, z)$. The coupling efficiency $\eta$ in the case where there is the distance-shift D, in the case of transmitting light with a different wavelength $\lambda_i$ to the optical coupler 1, is a function $\eta(\lambda_i, z)$ of the wavelength $\lambda_i$ of transmission light and the lens length z and can be represented as in equations (8) and (9) below. Herein, $k_i = 2\pi/\lambda_i$.

[Math. 5]

$$Z(\lambda_i, z) = \frac{D(\lambda_i, z)}{n_1(\lambda_i)k_i\{\omega_0(\lambda_i, z)\}^2} \quad (8)$$

$$\eta(\lambda_i, z) = \frac{4[4\{Z(\lambda_i, z)\}^2 + 1]}{[4\{Z(\lambda_i, z)\}^2 + 2]^2 + 4\{Z(\lambda_i, z)\}^2} = \frac{1}{\{Z(\lambda_i, z)\}^2 + 1} \quad (9)$$

Figure 4:
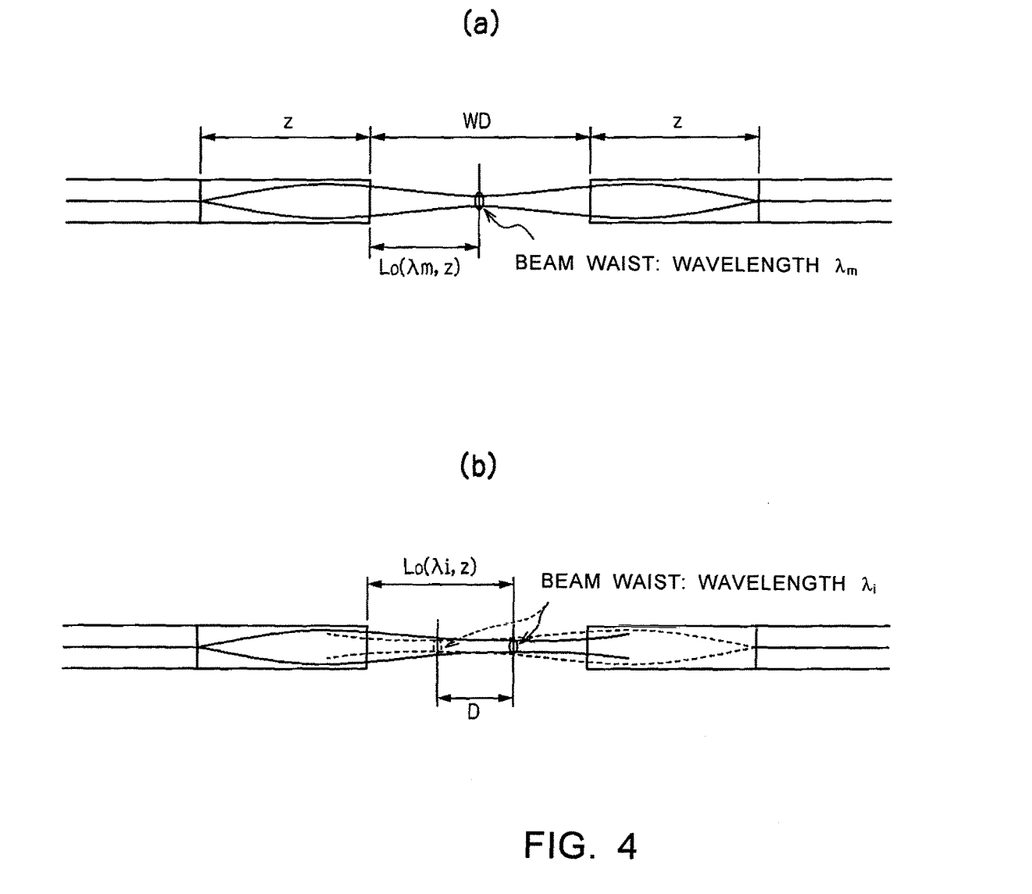
FIG. 4 is a set of illustration diagrams showing a design technique for an optical coupler according to an embodiment of the present invention.

FIG. 4 shows a design technique for the optical coupler 1 according to the embodiment of the present invention. The optical coupler 1 according to the embodiment of the present invention seeks the optimization of the coupling efficiency of a case where light with different wavelengths is coupled, through the setting of the lens length z along the optical axis direction of the GRIN lens 12 and of the inter-lens distance WD. First, as shown in FIG. 4(a), the beam waist distance $L_0(\lambda_m, z)$ is evaluated, with the target being light with a shortest wavelength $\lambda_m$ out of transmission light. The inter-lens distance WD is set such that the beam waist position coincides with the intermediate position of the inter-lens distance WD.

When light with the wavelength $\lambda_i$ different from the wavelength $\lambda_m$ is coupled in the optical coupler 1, in a state where the intermediate position of the inter-lens distance WD and the beam waist position of light with the wavelength $\lambda_m$ coincide, there is the distance-shift D, as shown in FIG. 4(b), in the beam waist position of light with the wavelength $\lambda_i$. The coupling efficiency $\eta$ thereupon is represented by equations (8) and (9). Herein, the coupling efficiency $\eta(\lambda_i, z)$ of a case where light with the wavelength $\lambda_i$ is coupled is sought to be made appropriate, through adjusting the lens length z in the equations (8) and (9). Thereupon, the beam waist distance $L_0(\lambda_m, z)$ of light with the wavelength $\lambda_m$ changes in accordance with the adjustment of the lens length z. In accordance therewith, the inter-lens distance WD is variably adjusted, such that the beam waist position of light with the wavelength $\lambda_m$ coincides with the intermediate position of the inter-lens distance WD.

FIG. 5 to FIG. 8 show setting examples of the lens length z of the optical coupler 1 according to the embodiment of the present invention. The setting examples are shown of the inter-lens distance WD and the lens length z for a case where single-wavelength light with different wavelengths (in which the wavelength $\lambda_1$ is 450 nm, the wavelength $\lambda_2$ is 532 nm, and the wavelength $\lambda_3$ is 635 nm) is coupled, in the optical coupler 1 in which the optical fibers with GRIN lens 10 formed of the GRIN lens 12 having a certain lens parameter and the single-mode optical fiber 11 set to the certain beam diameter $2\omega_s$ are disposed to face each other coaxially.

Figure 5:
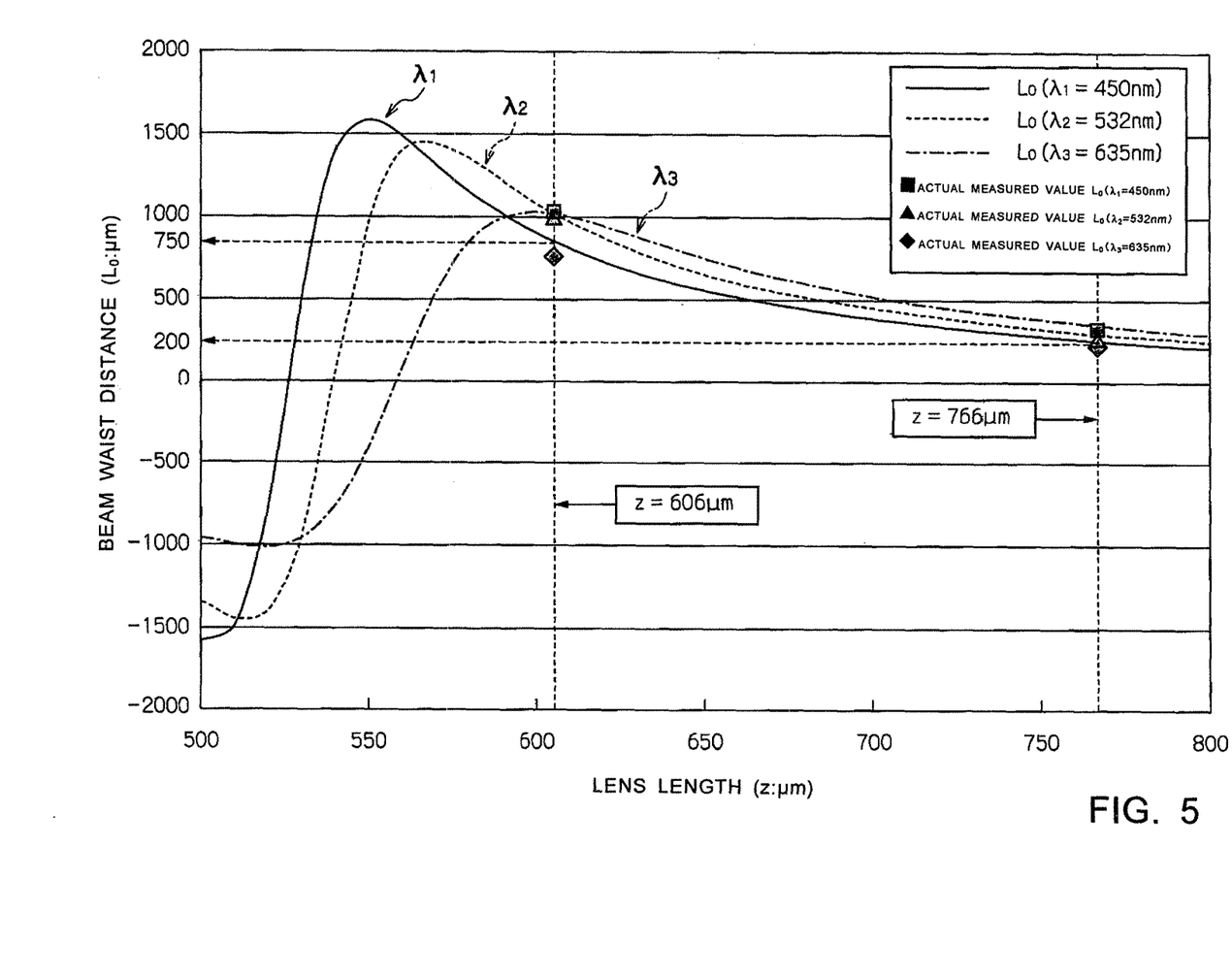
FIG. 5 is an illustration diagram showing a setting example of the lens length of the optical coupler according to the embodiment of the present invention (a graph showing the beam waist distance $L_0$ of light with respective wavelengths ($\lambda_1$, $\lambda_2$, and $\lambda_3$), in the case where the lens length z is changed).
Figure 6:
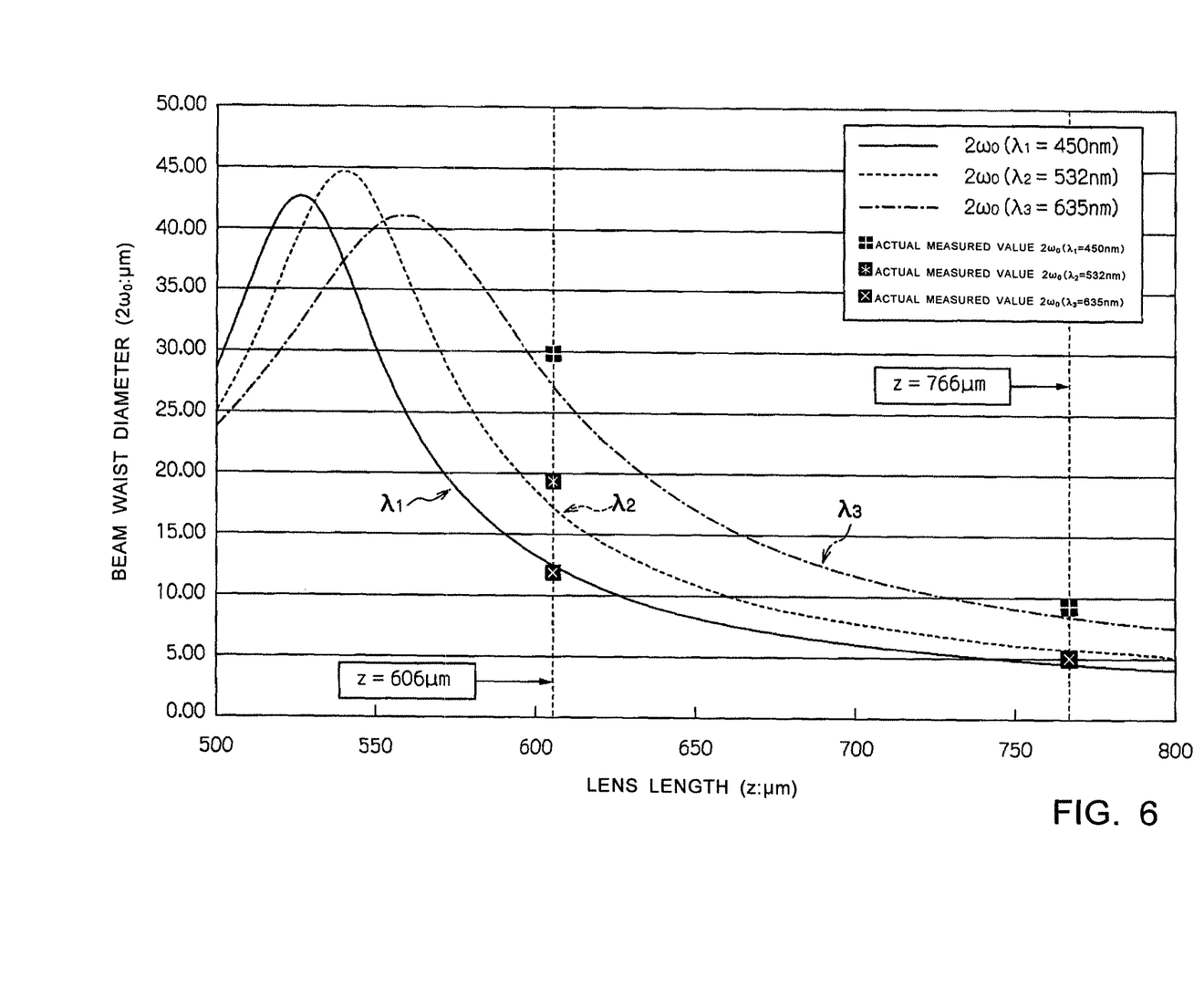
FIG. 6 is an illustration diagram showing a setting example of the lens length of the optical coupler according to the embodiment of the present invention (a graph showing the beam waist diameter $2\omega_0$ of light with the respective wavelengths ($\lambda_1$, $\lambda_2$, and $\lambda_3$), in the case where the lens length z is changed).
Figure 7:
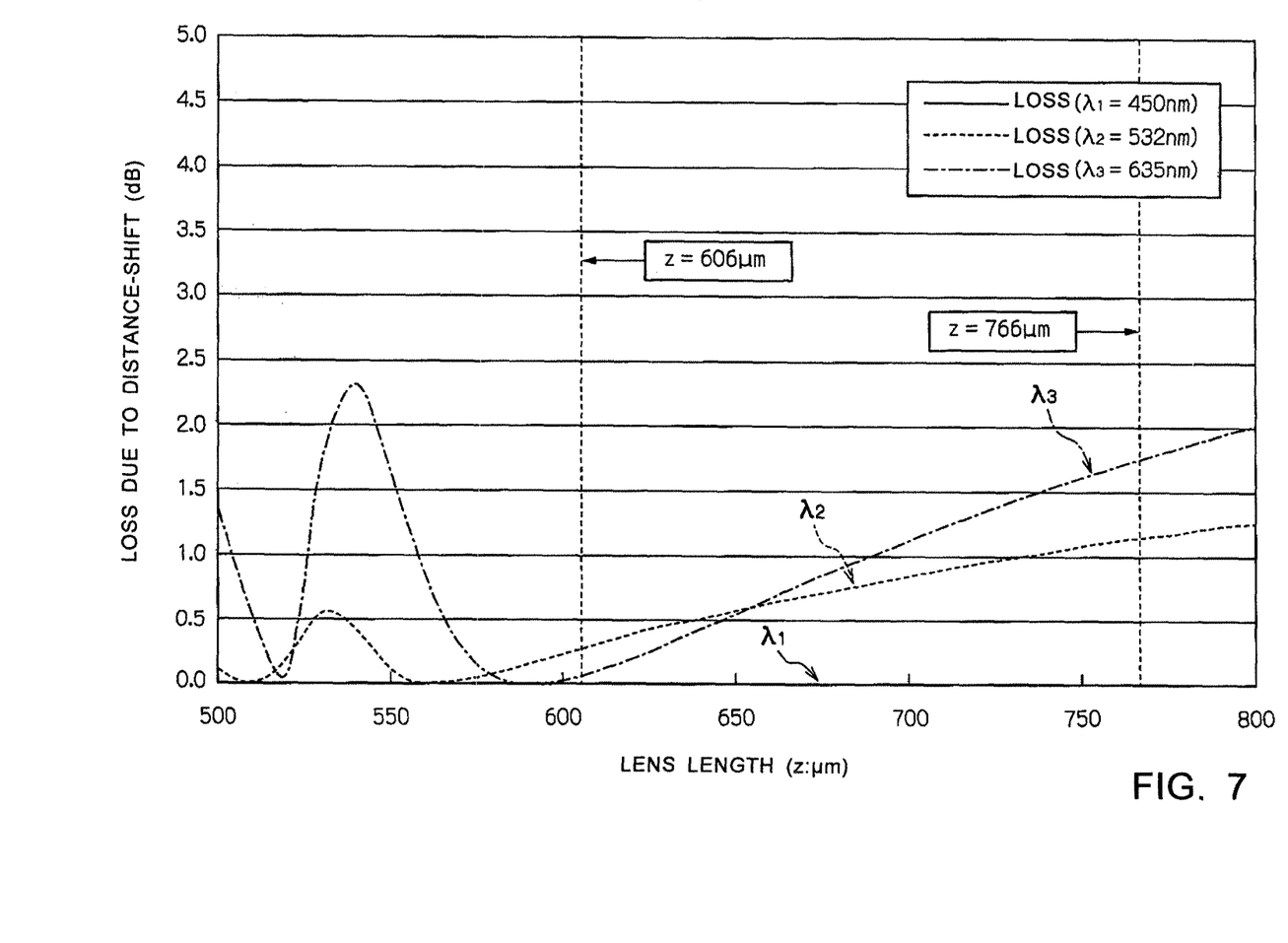
FIG. 7 is an illustration diagram showing a setting example of the lens length of the optical coupler according to the embodiment of the present invention (a graph showing the coupling loss due to a distance-shift D of light with the respective wavelengths ($\lambda_1$, $\lambda_2$, and $\lambda_3$), in the case where the lens length z is changed).
Figure 8:
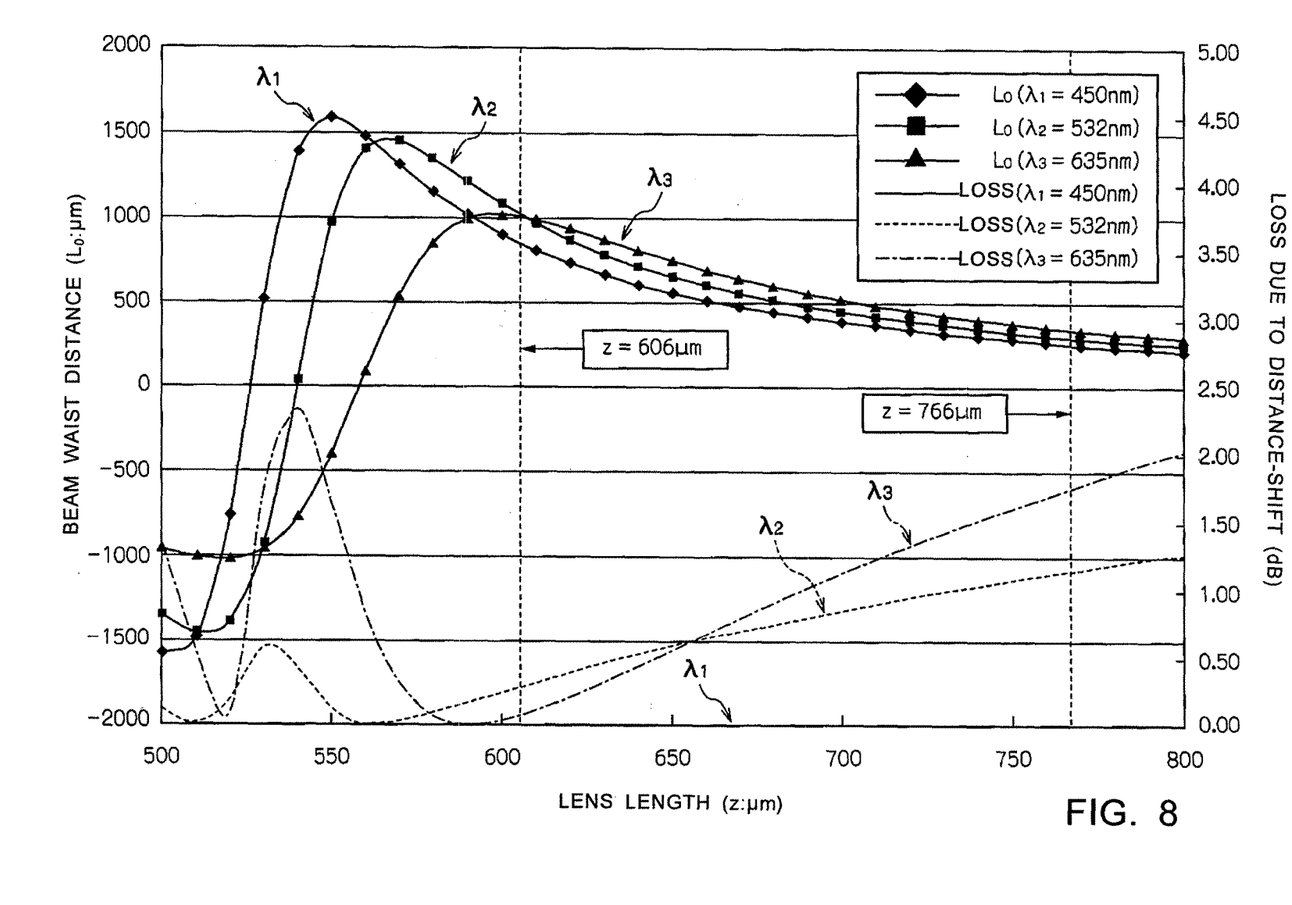
FIG. 8 is an illustration diagram showing a setting example of the lens length of the optical coupler according to the embodiment of the present invention (a graph in which FIG. 5 and FIG. 7 are composited).

FIG. 5 shows the beam waist distance $L_0$ of light with the respective wavelengths ($\lambda_1$, $\lambda_2$, and $\lambda_3$) of a case where the lens length z is changed. FIG. 6 shows the beam waist diameter $2\omega_0$ of light with the respective wavelengths ($\lambda_1$, $\lambda_2$, and $\lambda_3$) of a case where the lens length z is changed. FIG. 7 shows the coupling loss (dB) due to the distance-shift D for the respective wavelengths ($\lambda_1$, $\lambda_2$, and $\lambda_3$) of a case where the lens length z is changed. The coupling loss herein is calculated as $-10 \cdot \log_{10}(\eta(\lambda_i, z))$. FIG. 8 shows the beam waist distance $L_0$ shown in FIG. 5 and the coupling loss (dB) due to the distance-shift D shown in FIG. 7 superimposed.

Adjusting the lens length z herein changes the beam waist distance $L_0$ in the respective wavelengths ($\lambda_1$, $\lambda_2$, and $\lambda_3$). However, as a condition to evaluate the coupling loss $-10 \cdot \log_{10}(\eta(\lambda_i, z))$ due to the distance-shift D for the respective wavelengths ($\lambda_1$, $\lambda_2$, and $\lambda_3$), there is a condition that the beam waist position of light with the wavelength $\lambda_1$ (which equals 450 nm) that is the shortest wavelength be constantly the intermediate position of the inter-lens distance WD, i.e., the coupling loss for the wavelength $\lambda_1$ be constantly 0 dB regardless of the lens length z.

For the setting of the lens length z, herein, the setting value of the lens length z is made equal to 606 μm at which the coupling loss for light with the longest wavelength $\lambda_3$, which equals 635 nm, out of the wavelengths ($\lambda_1$, $\lambda_2$, and $\lambda_3$) is shown to be at the bottom and at which the beam waist distance $L_0$ for light of $\lambda_3$ becomes largest. When the beam waist distance $L_0$ of light with the wavelength $\lambda_1$ with this lens length z is evaluated and the inter-lens distance WD is set, the inter-lens distance WD that is set to equal $2 \times L_0$ equals 1500 μm (1.5 mm), since the beam waist distance $L_0$ of light with the shortest wavelength $\lambda_1$ out of the wavelengths ($\lambda_1$, $\lambda_2$, and $\lambda_3$) is 750 μm, as shown in FIG. 5.

Table 1 shows the actual measured values of the coupling loss of a case where light with the wavelengths $\lambda_1$ (450 nm), $\lambda_2$ (532 nm), and $\lambda_3$ (635 nm) is coupled by the optical coupler 1 (of a working example) including the lens length z (606 μm) and the inter-lens distance WD (1.5 mm) set in this manner. In the working example set in this manner, the difference in the coupling loss of light with different wavelengths (difference from 450 nm) is kept to less than 0.3 dB.

TABLE 1

| WD = 1.5 mm | | | |
|---|---|---|---|
| WAVELENGTH (nm) | LENS LENGTH (μm) | COUPLING LOSS (dB) | DIFFERENCE FROM 450 nm |
| 450 | 606 | 0.99 | 0.00 |
| 532 | 606 | 1.24 | 0.25 |
| 635 | 606 | 1.10 | 0.11 |

For the setting of the lens length z, in the working example described earlier, a value is set at which the coupling loss for light with the longest wavelength $\lambda_3$, which equals 635 nm, out of the wavelengths ($\lambda_1$, $\lambda_2$, and $\lambda_3$) is shown to be at the bottom. However, this is not limiting, and the lens length z may be set between a value at which the coupling loss for light with the intermediate wavelength $\lambda_2$ is shown to be at the bottom and a value at which the coupling loss for light with the longest wavelength $\lambda_3$ is shown to be at the bottom. That is, in the case where transmission light is light with different wavelengths of three or more wavelengths, the lens length is set in accordance with the bottom of the coupling loss for light with different wavelengths of two or more wavelengths except for the shortest wavelength. The bottom of the coupling loss herein can be specified to a range in which, for example, the coupling loss is 0.5 dB or less or, desirably, 0.3 dB or less. In the working example, a case of transmission with three different wavelengths has been described. However, the wavelength of transmission light can be set in a similar manner, as long as there are two or more different wavelengths.

In contrast, a comparative example is, in the example shown in FIG. 5 to FIG. 8, a case where the lens length z is set to be rather long without taking note of the coupling loss, the lens length z being set to where the respective beam waist distances $L_0$ of the different wavelengths ($\lambda_1$, $\lambda_2$, and $\lambda_3$) become approximate. For example, when the lens length z is set to 766 μm, the inter-lens distance WD is, as shown in FIG. 5, such that the inter-lens distance WD, which equals $2 \times L_0$, equals 400 μm (0.4 mm), since the beam waist distance $L_0$ of light with the wavelength $\lambda_1$ with this lens length z is 200 μm.

Table 2 shows the actual measured values of the coupling loss of a case where light with the wavelengths $\lambda_1$ (450 nm), $\lambda_2$ (532 nm), and $\lambda_3$ (635 nm) is coupled by the optical coupler (of the comparative example) including the lens length z (766 μm) and the inter-lens distance WD (0.4 mm) set in this manner. In the comparative example set in this manner, the difference in the coupling loss of light with the different wavelengths (difference from 450 nm) is 1.76 dB at maximum.

TABLE 2

| WD = 0.4 mm | | | |
|---|---|---|---|
| WAVELENGTH (nm) | LENS LENGTH (μm) | COUPLING LOSS (dB) | DIFFERENCE FROM 450 nm |
| 450 | 766 | 2.01 | 0.00 |
| 532 | 766 | 3.15 | 1.15 |
| 635 | 766 | 3.77 | 1.76 |

In this manner, in the case of coupling light with different wavelengths with the optical coupler 1 according to the embodiment of the present invention, the intermediate position of the inter-lens distance WD is set to match the beam waist position for light with the shortest wavelength $\lambda_m$ out of transmission light, and the lens length z along the optical axis direction of the GRIN lens 12 is set such that the coupling loss due to the distance-shift D of the beam waist position of light with another wavelength $\lambda_i$ is shown to be at the bottom. With the optical coupler 1 set in this manner, the coupling efficiency can be made appropriate with all wavelengths of transmission light.

In the case where the intermediate position of the inter-lens distance WD is disposed to match the beam waist position for light with the shortest wavelength $\lambda_m$ out of transmission light, the coupling loss $-10 \cdot \log_{10}(\eta(\lambda_i, z))$ due to the distance-shift D of the beam waist position of light with another wavelength $\lambda_i$ changes according to the lens length z, as shown in FIG. 7. The bottom of the coupling loss $-10 \cdot \log_{10}(\eta(\lambda_i, z))$ can be obtained by setting the lens length z that is set between $z_{1/4}$ shown by the equation (3) described above and $z_{1/2}$, which equals $2 \times z_{1/4}$, to be relatively short. When the lens length z is shortened between $z_{1/4}$ and $z_{1/2}$, which equals $2 \times z_{1/4}$, as shown in FIG. 8, the beam waist distance $L_0$ of the wavelength $\lambda_i$ is shown to be at the peak. Near the lens length z at which there is the peak, the coupling loss $-10 \log_{10}(\eta(\lambda_i, z))$ is shown to be at the bottom (near the minimum value). The embodiment of the present invention utilizes such characteristics, and the coupling loss of light with another wavelength $\lambda_i$ for which the distance-shift D occurs is sought to be made appropriate by the adjustment of the lens length z.

In contrast, conventionally, the lens length z has been set to be rather long between $z_{1/4}$ shown by the equation (3) described above and $z_{1/2}$, which equals $2 \times z_{1/4}$, such that the setting causes the beam waist distances $L_0$ for all wavelengths to be close values, as in the comparative example described earlier, taking note only of the beam waist distances $L_0$ for all wavelengths without taking note of the coupling loss $-10 \cdot \log_{10}(\eta(\lambda_i, z))$ described earlier. As shown in FIG. 8, when the lens length z is set to be rather long at 766 μm, the difference of the beam waist distances $L_0$ for the respective wavelengths is small.

However, with such a setting of the lens length, the coupling efficiency of light with different wavelengths cannot be made appropriate, as shown in Table 2. This is because, although the beam waist distances $L_0$ become close values for the respective wavelengths with such a setting in which the lens length z is rather long, the change rate of the beam waist radius near the beam waist position is steep, and a slight difference in the beam waist distance $L_0$ causes a large difference in the coupling efficiency for the respective wavelengths.

Figure 9:
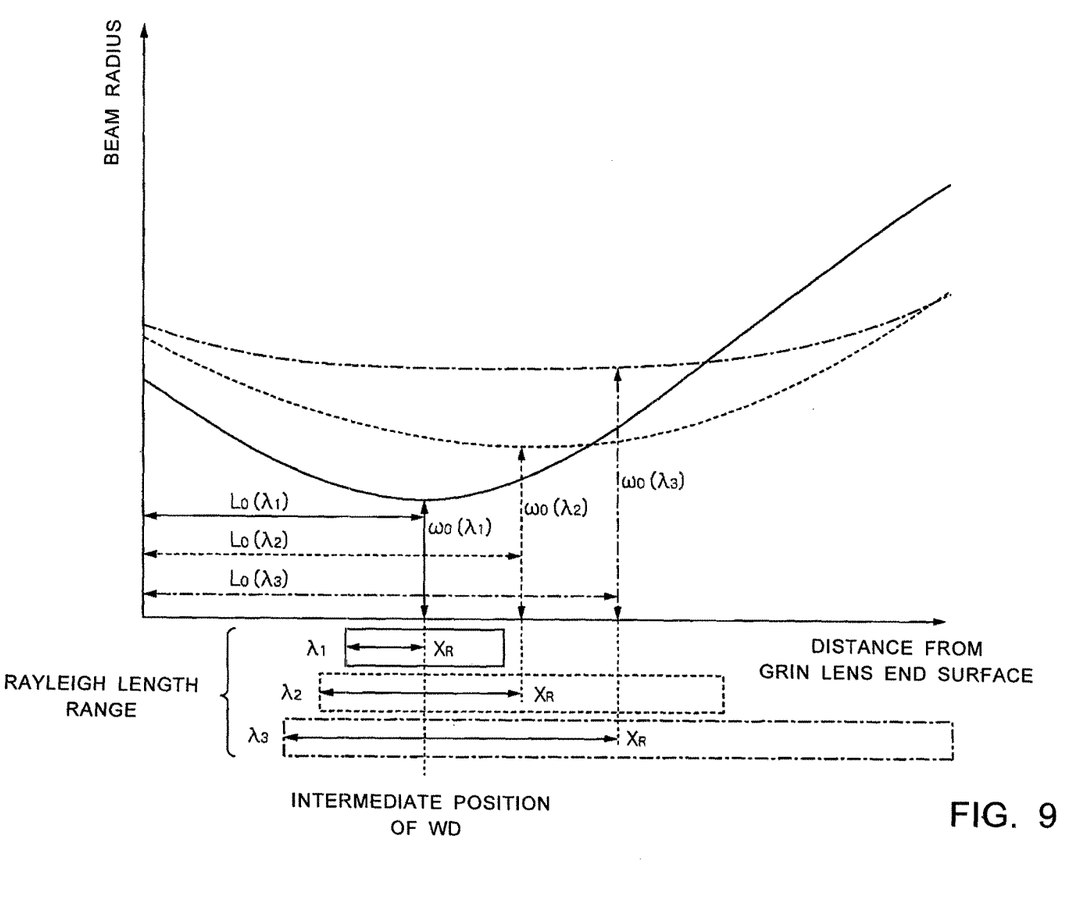
FIG. 9 is a graph showing the condensed state of light emitted from the optical fiber with GRIN lens of the optical coupler according to the embodiment of the present invention.

FIG. 9 shows the condensed state of light emitted from the optical fiber with GRIN lens 10 in the optical coupler 1 according to the embodiment of the present invention. As described earlier, in the case where the intermediate position of the inter-lens distance WD is set to match the beam waist position for light with the shortest wavelength $\lambda_m$ out of transmission light, and the lens length z along the optical axis direction of the GRIN lens 12 is set such that the coupling loss due to the distance-shift D of the beam waist position of light with another wavelength $\lambda_i$ is shown to be at the bottom, there is a magnitude relationship of $L_0(\lambda_1) < L_0(\lambda_2) < L_0(\lambda_3)$ as shown in the drawing for beam waist distances $L_0(\lambda_1)$, $L_0(\lambda_2)$, and $L_0(\lambda_3)$ of transmission light (in which the wavelength $\lambda_1$ is 450 nm, the wavelength $\lambda_2$ is 532 nm, and the wavelength $\lambda_3$ is 635 nm), and there is a relationship of $\omega_0(\lambda_1) < \omega_0(\lambda_2) < \omega_0(\lambda_3)$ as shown in the drawing for beam waist radii $\omega_0(\lambda_1)$, $\omega_0(\lambda_2)$, $\omega_0(\lambda_3)$ for the respective wavelengths.

With the setting of the inter-lens distance WD and the lens length z in the embodiment of the present invention, the condensed state of light emitted from the optical fiber with GRIN lens 10 shows characteristics that the change rate of the condensed state along the optical axis direction is different for each wavelength. With the shortest wavelength $\lambda_1$, the change in the condensed state near the beam waist position is steep. However, with the longest wavelength $\lambda_3$, the change in the condensed state near the beam waist position is moderate. Such a change in the condensed state near the beam waist position can be described with a Rayleigh length $X_R$ for a Gaussian beam represented by an equation (10) below (where $\omega_0$ is the beam waist radius, and $\lambda$ is the wavelength of transmission light).

$$X_R = \pi \omega_0^2 / \lambda \tag{10}$$

The Rayleigh length $X_R$ is the distance between the position in the optical axis direction in which the beam diameter is $2^{1/2}$ times the beam waist diameter and the beam waist position. When the Rayleigh length $X_R$ is shorter, the change in the condensed state near the beam waist is steeper. When the Rayleigh length $X_R$ is longer, the change in the condensed state near the beam waist is more moderate.

For the condensed state of light emitted from the optical fiber with GRIN lens 10, as shown in FIG. 9, a Rayleigh length range (range in which the Rayleigh length $X_R$ is set on both sides in the front and back of the beam waist position) can be set in the front and back of the beam waist position. With the concept of the Rayleigh length range introduced, the intermediate position of the inter-lens distance WD is set to a position in which the respective Rayleigh length ranges of all wavelengths of transmission light overlap, in the case where the inter-lens distance WD and the lens length z along the optical axis direction of the GRIN lens 12 are set as in the embodiment of the present invention.

In this manner, in the optical coupler 1 according to the embodiment of the present invention, the change in the condensed state near the beam waist position is steepest. With respect to the wavelength (shortest wavelength) for which a decrease in the coupling efficiency due to a mismatch in the center position of the inter-lens distance WD and the beam waist position is largest, an optimum coupling efficiency is made obtainable by causing the center position of the inter-lens distance WD to match the beam waist position. Regarding other wavelengths for which the change in the condensed state near the beam waist is relatively moderate, a light-coupled state in which the coupling efficiency does not greatly decrease is achieved with the other wavelengths as well, by a setting such that the center position of the inter-lens distance WD falls within the Rayleigh length range for the beam waist of light with the respective wavelengths.

Such a condensed state of emitted light for each wavelength is achieved by setting the lens length z to be rather short between $z_{1/4}$ and $z_{1/2}$, which equals $2 \times z_{1/4}$, as in the embodiment of the present invention. In the case where the lens length z is set to be rather long between $z_{1/4}$ and $z_{1/2}$, which equals $2 \times z_{1/4}$, the change in the condensed state near the beam waist position is steep for all wavelengths, and the coupling efficiency of light with respective wavelengths cannot be made appropriate.

As described above, with the optical coupler 1 and the optical coupling method using the same according to the embodiment of the present invention, an appropriate coupling efficiency can be obtained with each wavelength without changing the setting of the inter-lens distance WD for each wavelength, even in the case where light with different wavelengths is transmitted, by setting the intermediate position of the inter-lens distance WD to match the beam waist position for light with the shortest wavelength $\lambda_m$ out of transmission light and setting the lens length z along the optical axis direction of the GRIN lens 12 in accordance with the bottom of the coupling loss due to the distance-shift D of the beam waist position of light with the wavelength $\lambda_i$ different from the wavelength $\lambda_m$ out of the transmission light.

REFERENCE SIGNS LIST

1: Optical coupler
10: Optical fiber with GRIN lens
11: Optical fiber
12: GRIN lens
WD: Inter-lens distance
z: Lens length
$L_0$: Beam waist distance

The invention claimed is:

1. An optical coupler in which optical fibers with GRIN lenses, each having an optical fiber and a GRIN lens joined coaxially, are disposed to face each other coaxially, with a preset inter-lens distance being provided, and to couple transmission light of one of the optical fibers with GRIN lenses to the other one of the optical fibers with GRIN lenses,
   wherein an intermediate position of said inter-lens distance is set to match a beam waist position for light with a shortest wavelength out of said transmission light, and
   wherein a lens length along an optical axis direction of said GRIN lens is set in accordance with a bottom of a coupling loss due to a distance-shift of a beam waist position of light with a wavelength different from said wavelength out of said transmission light.

2. The optical coupler according to claim 1, wherein said intermediate position is set in a position in which respective Rayleigh length ranges for all wavelengths of said transmission light overlap.

3. The optical coupler according to claim 1, wherein said bottom of the coupling loss is 0.5 dB or less.

4. An optical coupling method of an optical fiber with GRIN lens in which optical fibers with GRIN lenses, each having an optical fiber and a GRIN lens joined coaxially, are disposed to face each other coaxially, with a preset inter-lens distance being provided, and to couple transmission light of one of the optical fibers with GRIN lens to the other one of the optical fibers with GRIN lens, the method comprising:
setting an intermediate position of said inter-lens distance to match a beam waist position for light with a shortest wavelength out of said transmission light, and
setting a lens length along an optical axis direction of said GRIN lens in accordance with a bottom of a coupling loss due to a distance-shift of a beam waist position of light with a wavelength different from said wavelength out of said transmission light.

* * * * *